(12) United States Patent
Chang et al.

(10) Patent No.: US 8,059,226 B2
(45) Date of Patent: Nov. 15, 2011

(54) BACKLIGHT ASSEMBLY WITH LIGHT SOURCE FASTENED TO RECEIVING CONTAINER AND LIQUID CRYSTAL DISPLAY HAVING THE SAME

(75) Inventors: Moon Hwan Chang, Cheonan-Si (KR); Gi Cherl Kim, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 200 days.

(21) Appl. No.: 12/026,137

(22) Filed: Feb. 5, 2008

(65) Prior Publication Data

US 2008/0186425 A1   Aug. 7, 2008

(30) Foreign Application Priority Data

Feb. 6, 2007   (KR) .................. 10-2007-0012394

(51) Int. Cl.
*G02F 1/1333*   (2006.01)
*G02F 1/1335*   (2006.01)
(52) U.S. Cl. ............ 349/58; 349/69; 362/612; 362/631; 362/632; 362/633; 362/634
(58) Field of Classification Search .................. 349/58, 349/69; 362/612, 631–634
See application file for complete search history.

(56) References Cited

U.S. PATENT DOCUMENTS

| | | |
|---|---|---|
| 2004/0156183 A1 | 8/2004 | Kim |
| 2006/0268194 A1 | 11/2006 | Morimoto et al. |
| 2006/0279946 A1* | 12/2006 | Park et al. ............... 362/97 |
| 2007/0019419 A1* | 1/2007 | Hafuka et al. ........... 362/373 |
| 2007/0165425 A1* | 7/2007 | Sakamoto et al. ....... 362/633 |

FOREIGN PATENT DOCUMENTS

EP   1521113   4/2005

OTHER PUBLICATIONS

Extended European Search Report for application No. 08001781.7-1228 dated Jul. 21, 2009.

* cited by examiner

*Primary Examiner* — Michael Caley
(74) *Attorney, Agent, or Firm* — Cantor Colburn LLP

(57) ABSTRACT

A backlight assembly and a liquid crystal display having the same are provided. The backlight assembly includes a light source unit including a circuit board and a light emitting diode mounted on the circuit board, a chassis on which the light source is disposed, and a first fastening unit for fastening the light source to the chassis. The first fastening unit includes a first fastening hole formed in the circuit board, and a protrusion formed on the chassis. The protrusion is inserted into the first fastening hole to be fastened thereto.

20 Claims, 10 Drawing Sheets

BACKLIGHT ASSEMBLY WITH LIGHT SOURCE FASTENED TO RECEIVING CONTAINER AND LIQUID CRYSTAL DISPLAY HAVING THE SAME

This application claims priority to Korean Patent Application No. 10-2007-0012394, filed on Feb. 6, 2007, and all the benefits accruing therefrom under 35 U.S.C. 119, the contents of which in its entirety are herein incorporated by reference.

BACKGROUND OF THE INVENTION

1. Field of the Invention

The present invention relates to a backlight assembly and a liquid crystal display having the same, and more particularly, to a backlight assembly, in which a light source and a receiving member are fastened to each other using a simplified fastening configuration, and a liquid crystal display having the backlight assembly.

2. Description of the Related Art

A backlight assembly using a light emitting diode ("LED") as a light source for a liquid crystal display has been developed. The backlight assembly using an LED may have various features, such as low power consumption, lightweight, and a slim shape as compared with conventional backlight assemblies using a cold cathode fluorescent lamp ("CCFL"). Generally, such a light source has been fastened to a chassis using a plurality of screws. However, such a fastening scheme results in an increase in manufacturing process time and material cost.

BRIEF SUMMARY OF THE INVENTION

Aspects of the present invention include a backlight assembly, in which a light source and a receiving member are fastened to each other using a simplified fastening configuration, and a liquid crystal display having the backlight assembly.

According to an exemplary embodiment of the present invention, there is provided a backlight assembly. The backlight assembly includes a light source unit having a circuit board, and a light source mounted on the circuit board. The backlight assembly also includes a receiving container on which the light source unit is disposed, and a first fastening unit for fastening the light source unit to the receiving container. The first fastening unit includes a first fastening hole formed in the circuit board, and a protrusion which is formed on the receiving container and is inserted into the first fastening hole to be fastened thereto.

The protrusion may be formed integrally with the receiving container.

The receiving container may include a base plate and a sidewall bent from the base plate.

The protrusion of the first fastening unit may be formed on the sidewall of the receiving container.

In another exemplary embodiment of the present invention, the backlight assembly may further include a second fastening unit for fastening the light source unit to the receiving container.

The second fastening unit may include a second fastening hole formed in the circuit board, a third fastening hole formed in the sidewall of the receiving container, and a fastening member inserted into the second hole and the third hole to be fastened thereto.

The second fastening holes may be formed at both ends of the circuit board, and the third fastening holes may be formed in the sidewall of the receiving container corresponding to positions of the second fastening holes.

The second fastening unit may include a second fastening hole formed in the circuit board and a hook formed on the sidewall of the receiving container.

The second fastening unit may include a fixing unit which is extended and bent from one end of the sidewall of the receiving container.

In another exemplary embodiment of the present invention, the protrusion of the first fastening unit may be formed on the base plate of the receiving container.

In yet another exemplary embodiment of the present invention, the backlight assembly may further include a second fastening unit for fastening the light source to the receiving container.

The second fastening unit may include a second fastening hole formed in the circuit board, a third fastening hole formed in the base plate of the receiving container, and a fastening member inserted into the second fastening hole and the third fastening hole to be fastened thereto.

The second fastening unit may include a second fastening hole formed in the circuit board, and a hook formed on the base plate of the receiving container.

The light source unit may include a plurality of circuit boards spaced apart from each other, each of the circuit boards formed in the shape of a bar.

The circuit board may be formed corresponding to the shape of the base plate.

The light source unit may include a plurality of substrates spaced apart from each other, each of the substrates formed in the shape of a bar. The second fastening holes may be formed at both ends of the substrates, respectively, and the third fastening holes may be formed in the sidewall of the receiving container corresponding to positions of the second fastening holes.

The circuit board may be formed corresponding to a shape of the base plate, the second fastening holes may be formed in at least one end of the circuit board, and the third fastening holes may be formed in the base plate of the receiving container corresponding to positions of the second fastening hole.

According to another aspect of the present invention, there is provided a liquid crystal display. The liquid crystal display includes a backlight assembly including a light source unit having a circuit board and a light source mounted on the circuit board, a receiving container on which the light source is disposed, and a first fastening unit for fastening the light source to the receiving container. The liquid crystal display also includes a liquid crystal display panel disposed on the backlight assembly to display an image. The first fastening unit includes a first fastening hole formed in the circuit board, and a protrusion formed on the receiving container, whereby the protrusion is inserted into the first fastening hole to be fastened thereto.

The protrusion may be formed integrally with the receiving container.

The liquid crystal display may further include a second fastening unit for fastening the light source to the receiving container.

BRIEF DESCRIPTION OF THE DRAWINGS

The above and other aspects, features, and advantages of the present invention will become more apparent by describing in detail exemplary embodiments thereof with reference to the attached drawings in which.

DETAILED DESCRIPTION OF THE INVENTION

Figure 1:
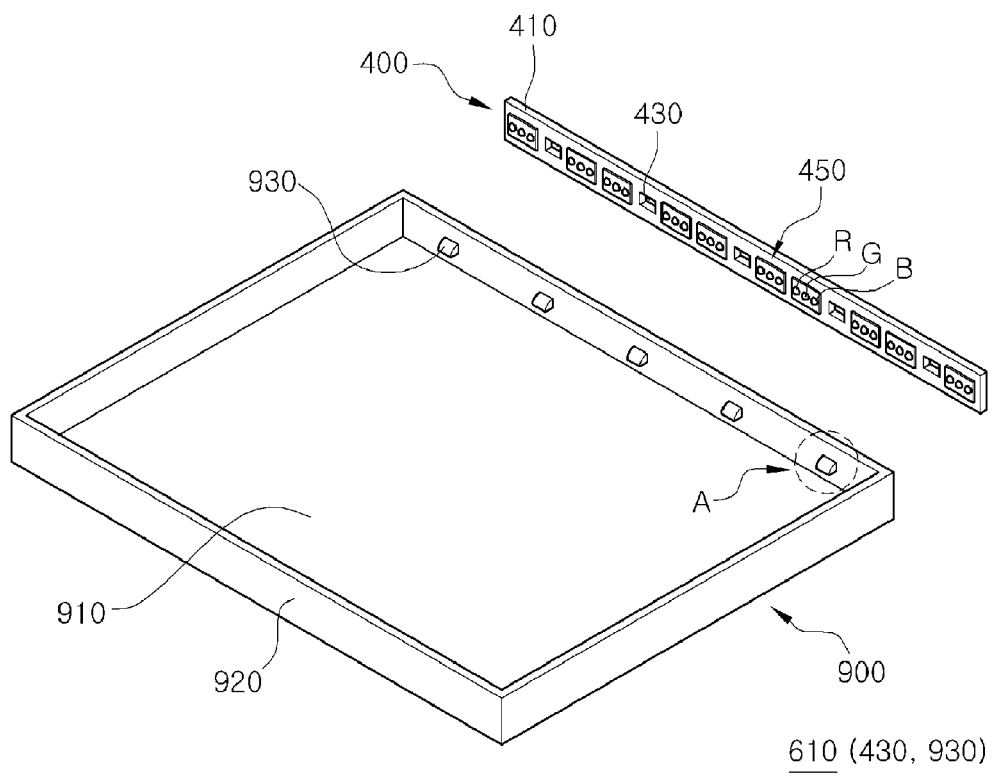
FIG. 1 is an exploded perspective view of a backlight assembly according to a first exemplary embodiment of the present invention.

Hereinafter, exemplary embodiments of the present invention will be described in detail with reference to the accompanying drawings. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
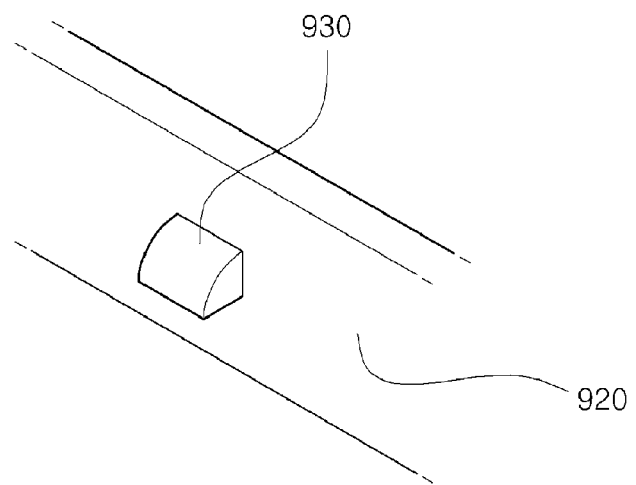
FIG. 2 is an enlarged view of a protrusion shown in FIG. 1.
Figure 3A:
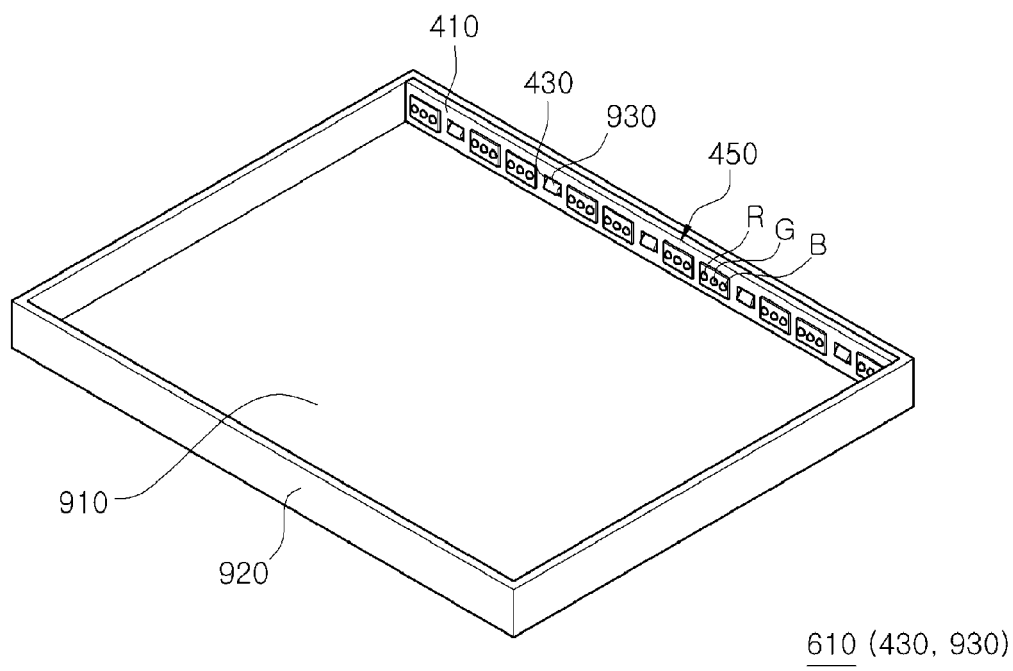
FIGS. 3A and 3B are perspective and plan views, respectively, showing an assembled state of the backlight assembly shown in FIG. 1.
Figure 3B:
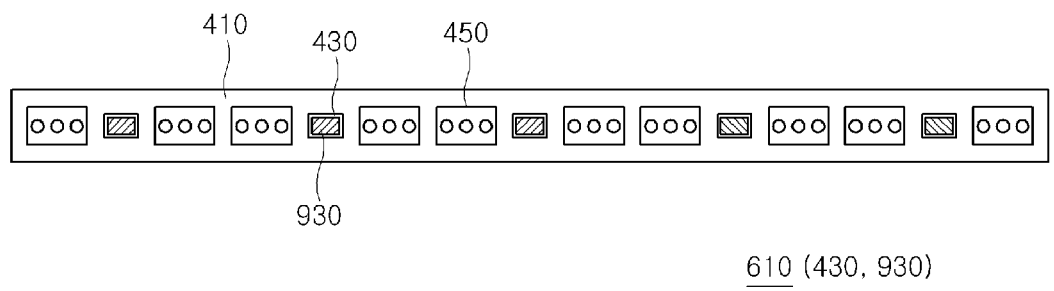

FIG. 1 is an exploded perspective view of a backlight assembly according to a first exemplary embodiment of the present invention, and FIG. 2 is an enlarged view of a protrusion shown in FIG. 1. FIGS. 3A and 3B are perspective and plan views showing an assembled state of the backlight assembly shown in FIG. 1, respectively.

Referring to FIGS. 1 to 3B, the backlight assembly includes a light source unit 400, a bottom chassis 900 and a first fastening unit 610.

The light source unit 400 includes a circuit board 410 and light emitting diodes 450 mounted on the circuit board 410. The bottom chassis 900 includes a base plate 910 and sidewalls 920 bent from the base plate 910, and has a receiving space defined therein. The light source unit 400 is disposed on and fastened to one of the sidewalls 920 of the bottom chassis 900 by means of the first fastening unit 610. The first fastening unit 610 includes first fastening holes 430 formed in the circuit board 410 and protrusions 930 formed on the sidewall 920 of the bottom chassis 900, so that the protrusions 930 can be inserted into the first fastening holes 430 to be fastened thereto. The protrusions 930 may be formed integrally with the bottom chassis 900.

A printed circuit board on which a circuit pattern is formed may be used as the circuit board 410 of the light source unit 400. The printed circuit board may be one of various printed circuit boards, such as a flexible printed circuit board ("FPCB"), a rigid printed circuit board or a metal printed circuit board. Further, the circuit board 410 may be formed in a rectangular shape, e.g., a bar shape. That is, the circuit board 410 may be configured to have a shape corresponding to that of the sidewall 920 of the bottom chassis 900.

The light emitting diodes 450 mounted on the circuit board 410 include red R, green G and blue B light emitting diodes, which are combined to make white light. However, a method of making the white light is not limited thereto.

The first fastening holes 430 are formed in regions of the circuit board 410 to which the light emitting diodes 450 are not mounted, and the protrusions 930 are formed to protrude from the sidewall 920 of the bottom chassis 900 toward the receiving space therein. The protrusions 930 may be formed corresponding to the size and shape of the first fastening holes 430, respectively. Accordingly, the protrusions 930 are inserted into the first fastening holes 430 and fastened thereto, so that the circuit board 410 of the light source unit 400 is fixed to the sidewall 920 of the bottom chassis 900. In an exemplary embodiment, the protrusions 930 and the first fastening holes 430 are formed in a rectangular or square shape. However, the shape of the first fastening unit 610 is not limited thereto, but may be changed variously.

Although the light source unit 400 is disposed only on the longer upper sidewall among the sidewalls 920 of the bottom chassis 900 in the present embodiment, the present invention is not limited thereto. For example, the light source unit 400 may be disposed on two or more sidewalls, or on a shorter sidewall as well as the longer sidewall.

Figure 4:
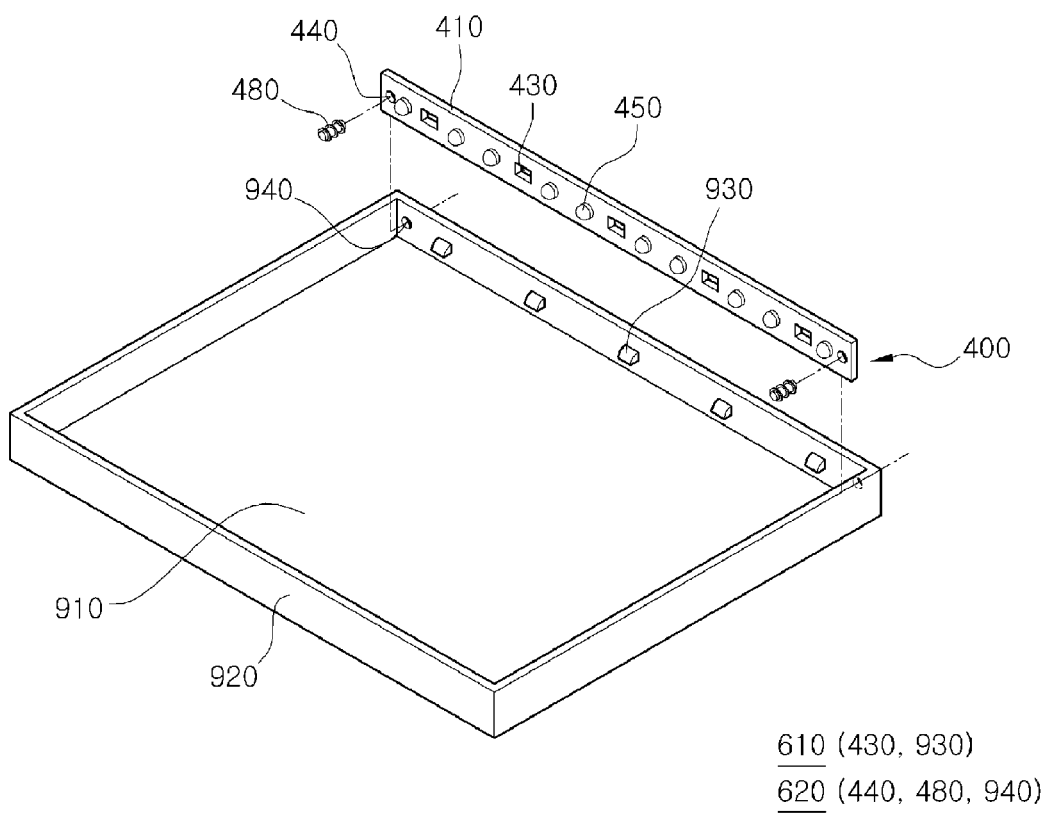
FIG. 4 is an exploded perspective view of a backlight assembly according to a second exemplary embodiment of the present invention.

FIG. 4 is an exploded perspective view of a backlight assembly according to a second exemplary embodiment of the present invention. The second embodiment of the present invention further includes a second fastening unit, as compared to the first exemplary embodiment. Some of the elements of the second exemplary embodiment are substantially similar to those of the first exemplary embodiment. To this extent, the following description will be focused on the differences.

Referring to FIG. 4, the backlight assembly according to the second exemplary embodiment includes a light source unit 400, a bottom chassis 900, a first fastening unit 610 and a second fastening unit 620.

The light source unit 400 includes a circuit board 410 and light emitting diodes 450 mounted on the circuit board 410. The bottom chassis 900 includes a base plate 910 and sidewalls 920 bent from the base plate 910, and has a receiving space defined therein. Light emitting diodes for emitting white light using a phosphor may be used as the light emitting diodes 450 mounted on the circuit board 410.

The light source unit 400 is disposed on and fastened to a sidewalls 920 of the bottom chassis 900 by means of the first fastening unit 610, and the fastening force between the light source unit 400 and the sidewall 920 is reinforced by means of the second fastening unit 620.

The first fastening unit 610 includes first fastening holes 430 formed in the circuit board 410 and protrusions 930 formed on the sidewall 920 of the bottom chassis 900, so that the protrusions 930 may be inserted into the first fastening holes 430 to be fastened thereto, respectively. The protrusions 930 may be formed integrally with the bottom chassis 900.

The second fastening unit 620 includes second fastening holes 440 formed in the circuit board 410, third fastening holes 940 formed in the sidewall 920 of the bottom chassis 900, and fastening members 480 inserted into the second fastening holes 440 and the third fastening holes 940 and fastened thereto, respectively. The second fastening unit 620 reinforces the fastening force for preventing the light source unit 400 fixed on the bottom chassis 900 by means of the first fastening unit 610 from being detached by an external shock.

The second fastening holes 440 are formed at both ends of the circuit board 410 to which the light emitting diodes 450 are not mounted, and the third fastening holes 940 are formed at both ends of the sidewall 920 of the bottom chassis 900 corresponding to positions of the second fastening holes 440. Screws may be used as the fastening members 480, but the present invention is not limited thereto. In addition, the components of the second fastening unit 620 may be formed at both ends of the circuit board 410 and the sidewall 920, respectively. However, the position and number of the components of the second fastening unit 620 are not limited thereto, but may be variously changed. Referring to FIGS. 5A to 6B, a variety of modifications of the second fastening unit 620 will be described below.

Figure 5A:
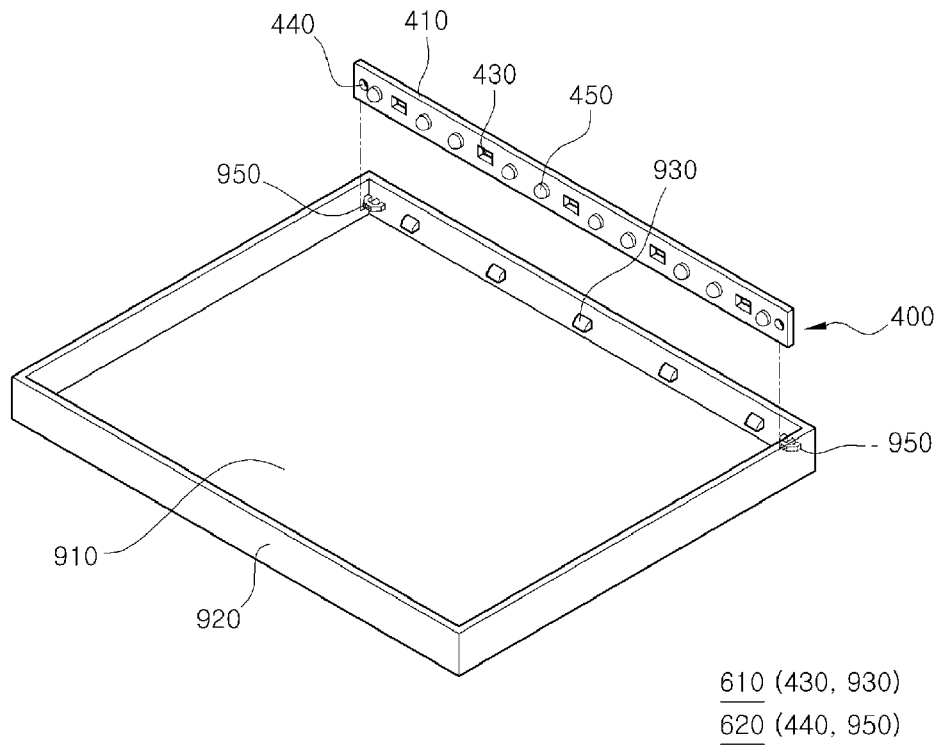
FIGS. 5A and 6A are exploded perspective views of modifications of the second exemplary embodiment of the present invention, respectively.
Figure 5B:
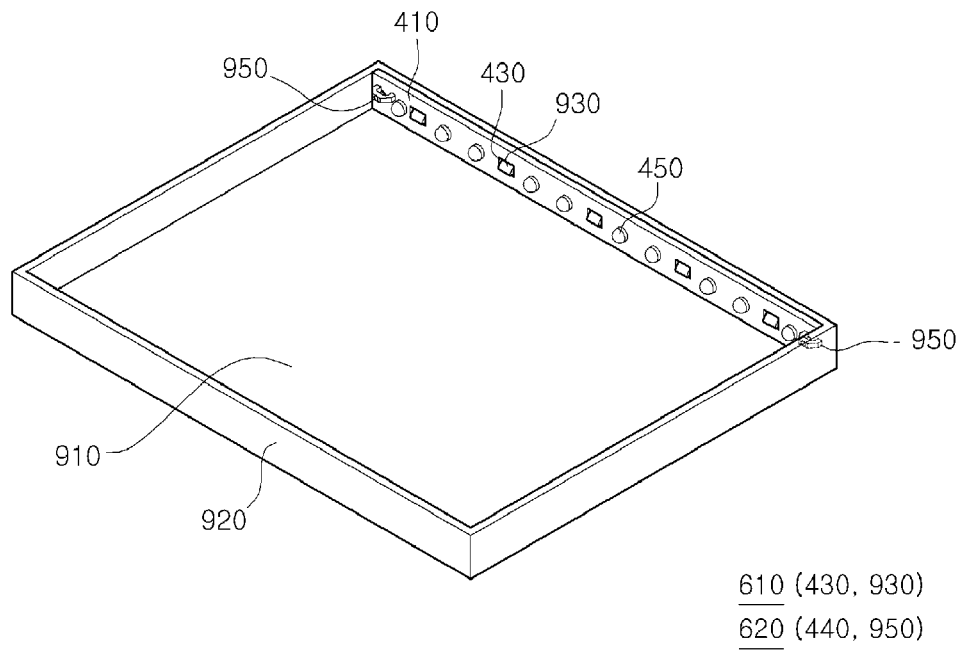
FIGS. 5B and 6B are perspective views showing assembled states thereof, respectively.
Figure 6A:
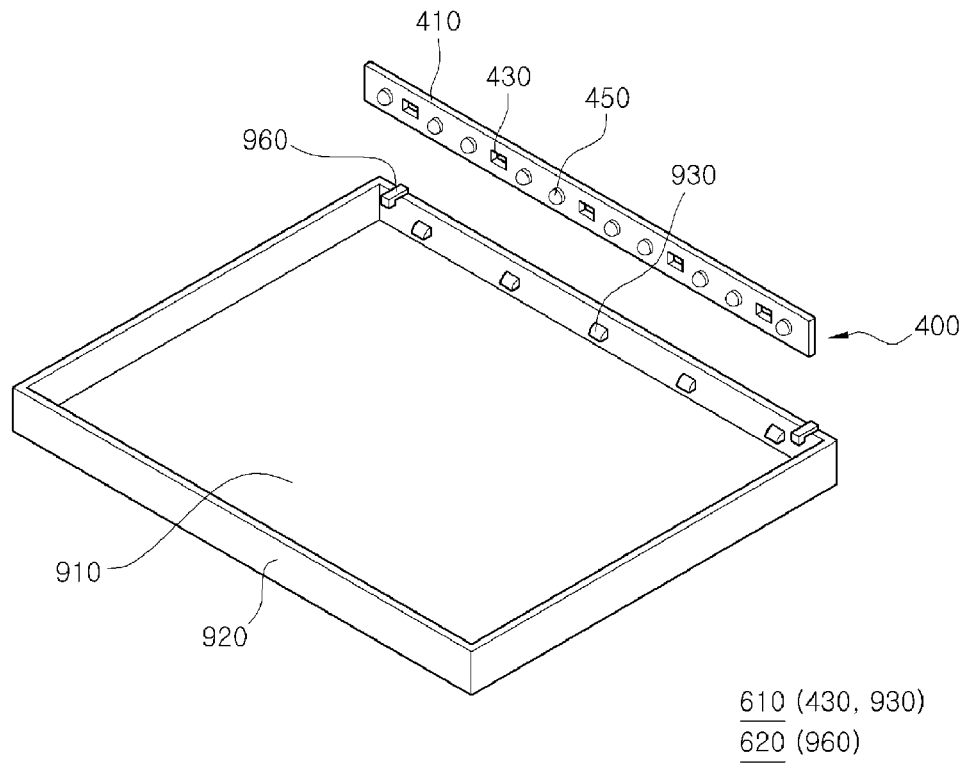
Figure 6B:
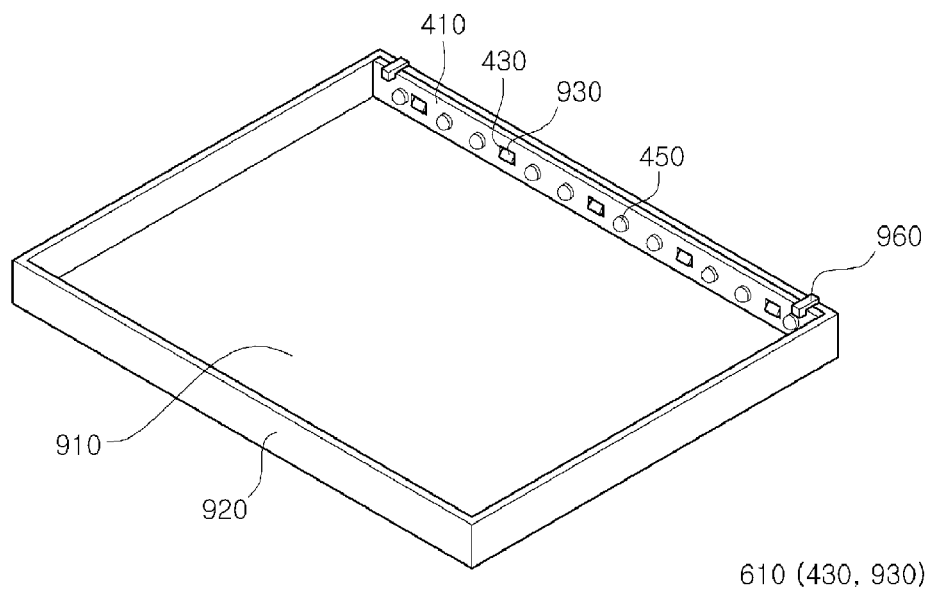

FIGS. 5A and 6A are exploded perspective views showing modifications of the second exemplary embodiment of the present invention, and FIGS. 5B and 6B are perspective views showing assembled states thereof, respectively.

Referring to FIGS. 5A and 5B, a second fastening unit 620 includes second fastening holes 440 formed in a circuit board 410, and hooks 950 formed on a sidewall 920 of a bottom chassis 900. The hooks 950 are inserted into and pass through the second fastening holes 440, whereby the circuit board 410 can be fixed on the sidewall 920 of the bottom chassis 900.

Referring to FIGS. 6A and 6B, a second fastening unit 620 includes fixing units 960, each of which extends inward from one end of a sidewall 920 of a bottom chassis 900 and includes a bent portion that extends downward toward the base plate 910. In other words, one end of each fixing unit 960 is formed to face a base plate 910 of the bottom chassis 900, while the other end of the fixing unit 960 is formed to face the sidewall 920 of the bottom chassis 900. The first end of the fixing unit 960 may be disposed perpendicular to the second end of the fixing unit 960. The circuit board 410 is disposed in a space defined between the fixing units 960 and the sidewall of the bottom chassis 900, so that the circuit board 410 can be primarily fixed by means of the first fastening unit 610 and secondarily fixed by means of the second fastening unit 620, i.e., the fixing units 960.

Figure 7:
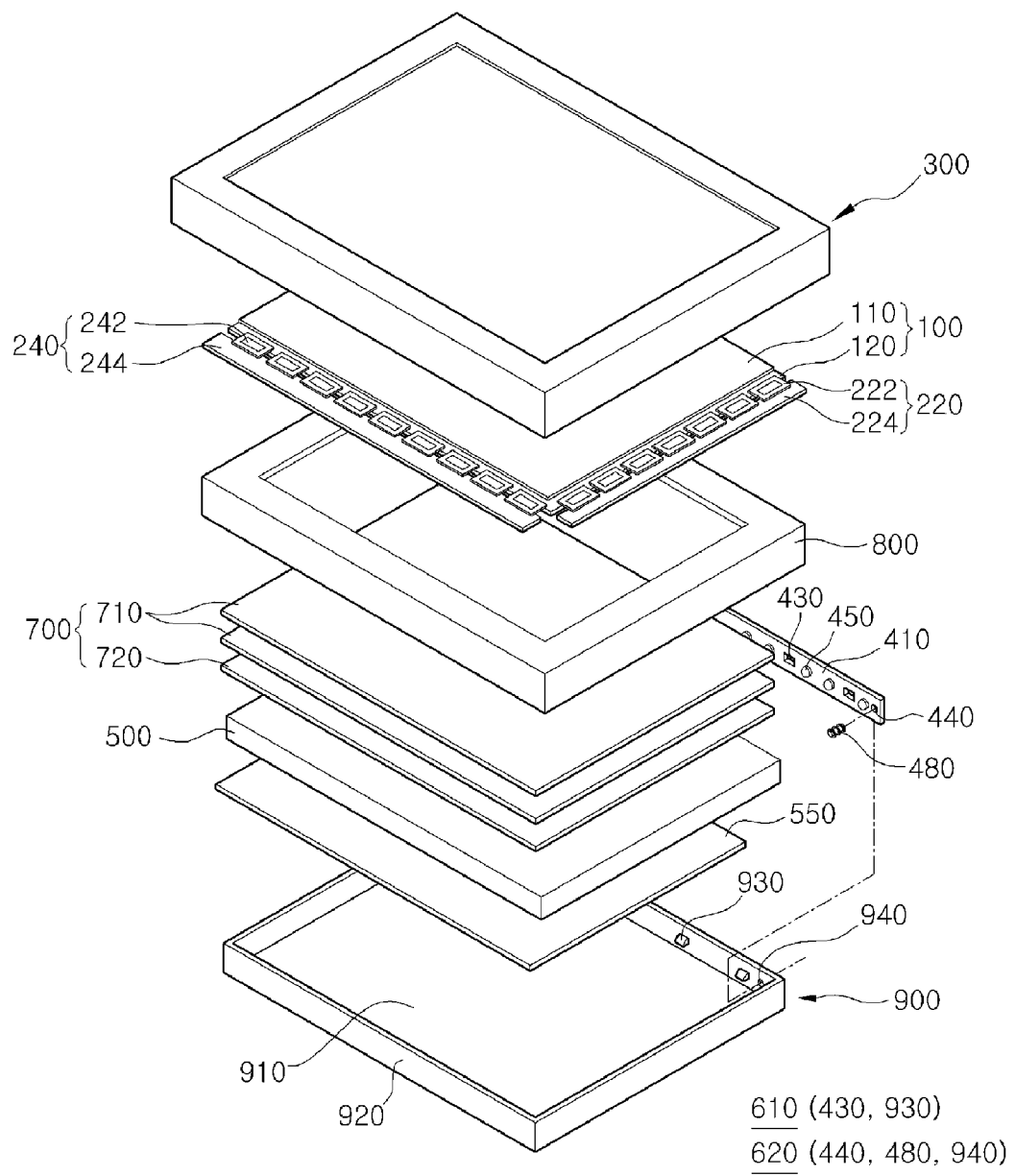
FIG. 7 is an exploded perspective view of a liquid crystal display including the backlight assembly shown in FIG. 4.

FIG. 7 is an exploded perspective view showing a liquid crystal display having the backlight assembly shown in FIG. 4.

Referring to FIG. 7, the liquid crystal display includes a liquid crystal display panel 100, driving circuit units 220 and 240, a top chassis 300, and the backlight assembly for providing a light to the liquid crystal display panel 100. The backlight assembly includes the light source unit 400, a light guide plate 500, a reflecting plate 550, a plurality of optical sheets 700, a mold frame 800 and the bottom chassis 900.

The liquid crystal display panel 100 includes a color filter substrate 110, a thin-film transistor ("TFT") substrate 120, and a liquid crystal layer (not shown) which is interposed between the color filter substrate 110 and the TFT substrate 120, thereby serving to display an image.

The driving circuit units 220 and 240 are connected to the liquid crystal display panel 100, and include a gate side printed circuit board 224, which is mounted with a control integrated circuit ("IC") and applies a predetermined gate signal to a gate line of the TFT substrate 120, a data side printed circuit board 244, which is mounted with a control IC and applies a predetermined gate signal to a data line of the TFT substrate 120, a gate side flexible printed circuit board 222 for connecting the TFT substrate 120 to the gate side printed circuit board 224, and a data side flexible printed circuit board 242 for connecting the TFT substrate 120 to the data side printed circuit board 244. The gate side and data side printed circuit boards 224 and 244 are respectively connected to the gate side and data side flexible printed circuit boards 222 and 242 in order to apply a gate driving signal and an external image signal. The gate side and data side printed circuit boards 224 and 244 may be integrated to be formed into a single printed circuit board. Further, a driving IC (not shown) is installed to the flexible printed circuit boards 222 and 242, so that Red, Green and Blue (RGB) signals generated from the gate side and data side printed circuit boards 224 and 244, power and the like are transferred to the liquid crystal display panel 100.

The light source unit 400 includes the circuit board 410 and the light emitting diodes 450 mounted on the circuit board 410. The bottom chassis 900 includes the base plate 910 and the sidewalls 920 bent from the base plate 910, and has the receiving space defined therein.

The light source unit 400 is disposed on and fastened to the sidewall 920 of the bottom chassis 900 by means of the first fastening unit 610, and the fastening force between the light source unit 400 and the sidewall 920 is reinforced by means of the second fastening unit 620.

The reflecting plate 550, the light guide plate 500, a diffusion plate 720 and a prism sheet 710 are sequentially disposed and received in the receiving space of the bottom chassis 900.

The light source unit 400 is disposed on one side of the light guide plate 500. The light emitted from the light source unit 400 is converted to a surface light source by the light guide plate 500, and then emitted towards the liquid crystal display panel 100. Although a flat-plate type light guide plate is employed in the embodiment of the present invention, the present invention is not limited thereto. That is, a wedge type light guide plate may be used. The mold frame 800 is fastened to the bottom chassis 900 and serves to support the liquid crystal display panel 100.

Figure 8:
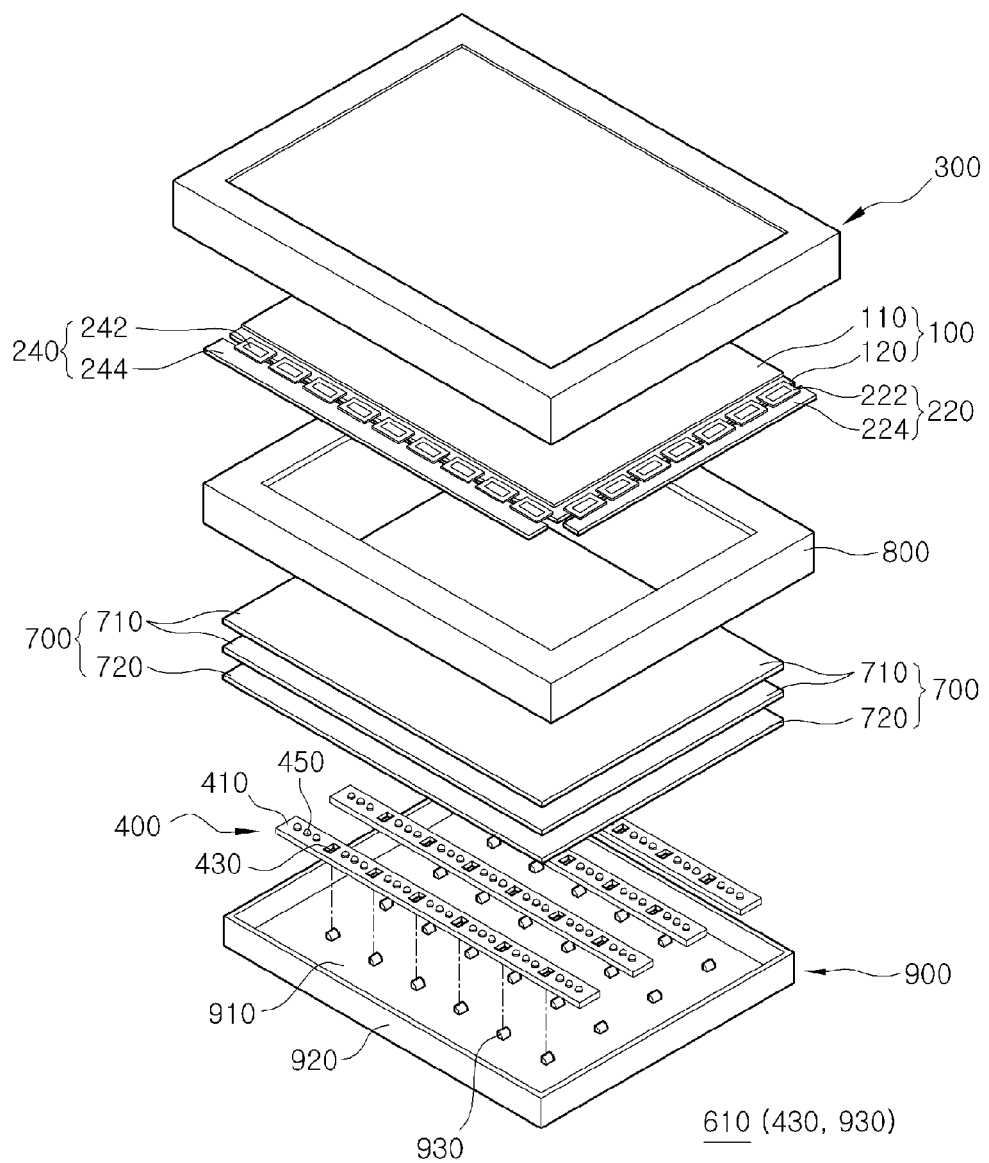
FIG. 8 is an exploded perspective view of a liquid crystal display including a backlight assembly according to a third exemplary embodiment of the present invention.
Figure 9:
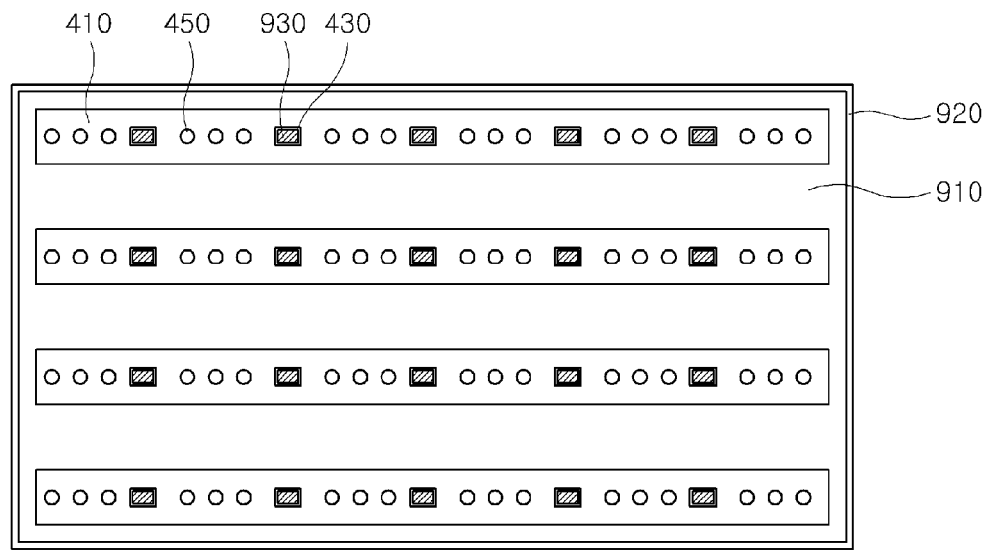
FIG. 9 is a plan view showing an assembled state of the backlight assembly according to the third exemplary embodiment of the present invention.
Figure 10:
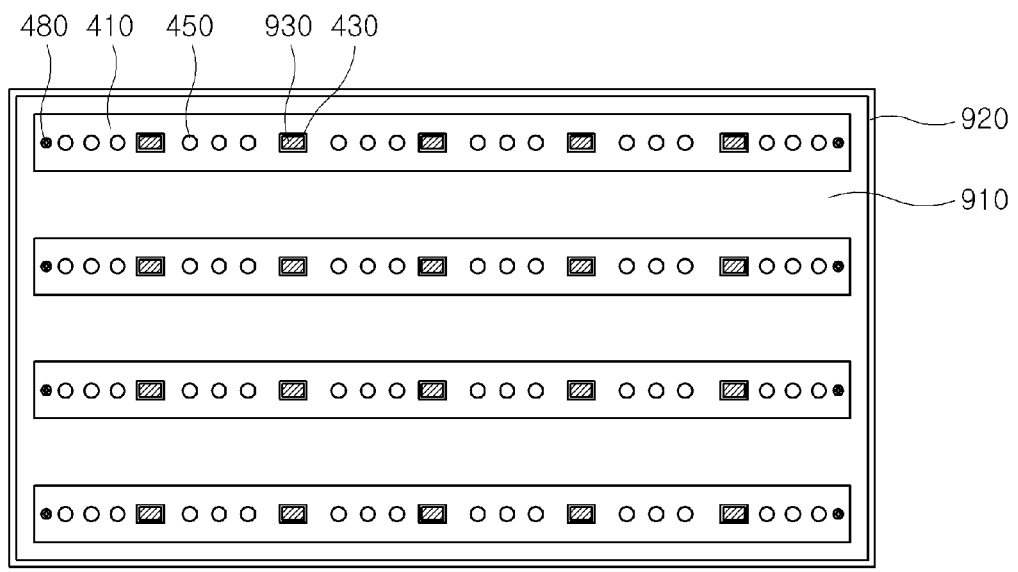
FIG. 10 is a plan view of a backlight assembly according to a fourth exemplary embodiment of the present invention.
Figure 11:
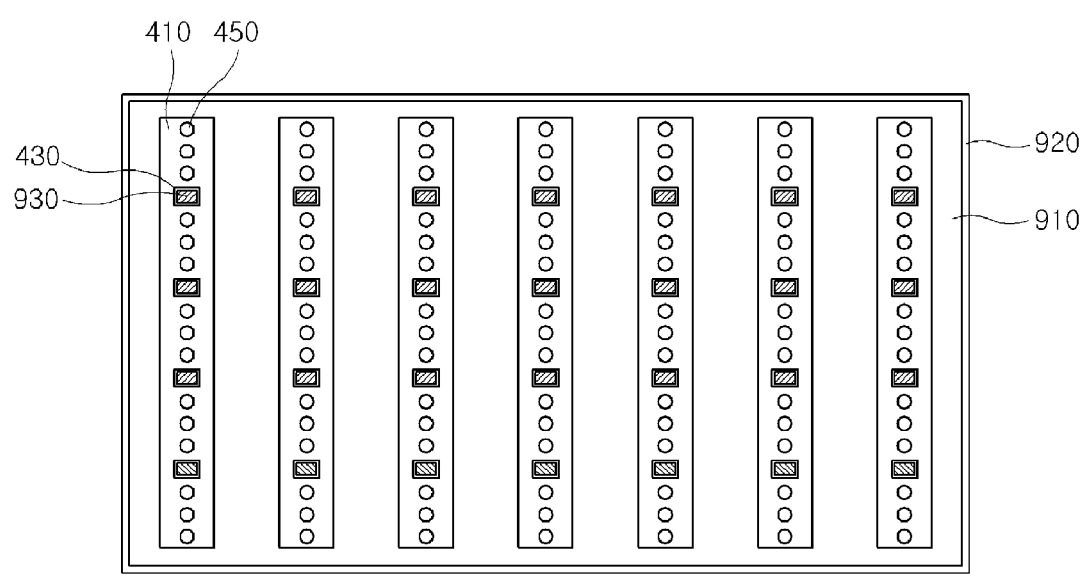
FIG. 11 is a plan view of a backlight assembly according to a fifth exemplary embodiment of the present invention.

FIG. 8 is an exploded perspective view showing a liquid crystal display including a backlight assembly according to a third exemplary embodiment of the present invention, FIG. 9 is a plan view showing an assembled state of the backlight assembly according to the third exemplary embodiment of the present invention, FIG. 10 is a plan view of a backlight assembly according to a fourth exemplary embodiment of the present invention, and FIG. 11 is a plan view showing a backlight assembly according to a fifth exemplary embodiment of the present invention.

The third to fifth exemplary embodiments of the present invention are examples in which the fastening configurations according to the first or second exemplary embodiment are employed to a direct type backlight assembly, and the following description will be focused on the differences.

Referring to FIGS. 8 and 9, a liquid crystal display includes a liquid crystal display panel 100, driving circuit units 220 and 240, a top chassis 300 and a backlight assembly for providing light to the liquid crystal display panel 100. The backlight assembly includes light source units 400, first fastening units 610, a plurality of optical sheets 700, a mold frame 800, and a bottom chassis 900.

Each of the light source units 400 includes a circuit board 410 and light emitting diodes 450 mounted on the circuit board 410. The bottom chassis 900 includes a base plate 910 and sidewalls 920 bent from the base plate 910, and has a receiving space defined therein.

The light source units 400 are disposed on and fastened to the base plate 910 of the bottom chassis 900 by means of the first fastening units 610. Each of the first fastening units 610 includes first fastening holes 430 formed in the circuit board 410 and protrusions 930 formed on the base plate 910 of the bottom chassis 900, so that the protrusions 930 can be inserted into the first fastening holes 430 to be fastened thereto. The protrusions 930 may be formed integrally with the bottom chassis 900.

The plurality of circuit boards 410, each of which is formed in the shape of a bar, are spaced apart from each other and disposed in a first direction, i.e., in parallel direction to the longer sidewalls (an abscissa direction). Alternatively, the plurality of circuit boards 410, each of which is also formed in the shape of a bar, are spaced apart from each other and disposed in a second direction, i.e., in a parallel direction to the shorter sidewalls (an ordinate direction) (see FIG. 11).

Referring to FIG. 10, a backlight assembly includes light source units 400, a bottom chassis 900, first fastening units 610, and second fastening units 620.

Each of the light source units 400 is disposed to be fastened to a base plate 910 of the bottom chassis 900 by means of the first fastening unit 610, and the fastening force between the light source unit 400 and the base plate 910 is reinforced by means of the second fastening unit 620.

The first fastening unit 610 includes first fastening holes 430 formed in a circuit board 410 and protrusions 930 formed on the base plate 910 of the bottom chassis 900, so that the protrusions 930 can be inserted into the first fastening holes 430 to be fastened thereto. The protrusions 930 may be formed integrally with the bottom chassis 900.

Each of the second fastening units 620 includes second fastening holes (not shown) formed in the circuit board 410, third fastening holes (not shown) formed in the base plate 910 of the bottom chassis 900, and fastening members 480 inserted into the second fastening holes and the third fastening holes and fastened thereto, respectively. The second fastening unit 620 reinforces the fastening force for preventing the light source unit 400 fixed on the bottom chassis 900 by means of the first fastening unit 610 from being detached by an external shock. The second fastening unit 620 may be formed in alternative shapes instead of the illustrated embodiment.

Figure 12:
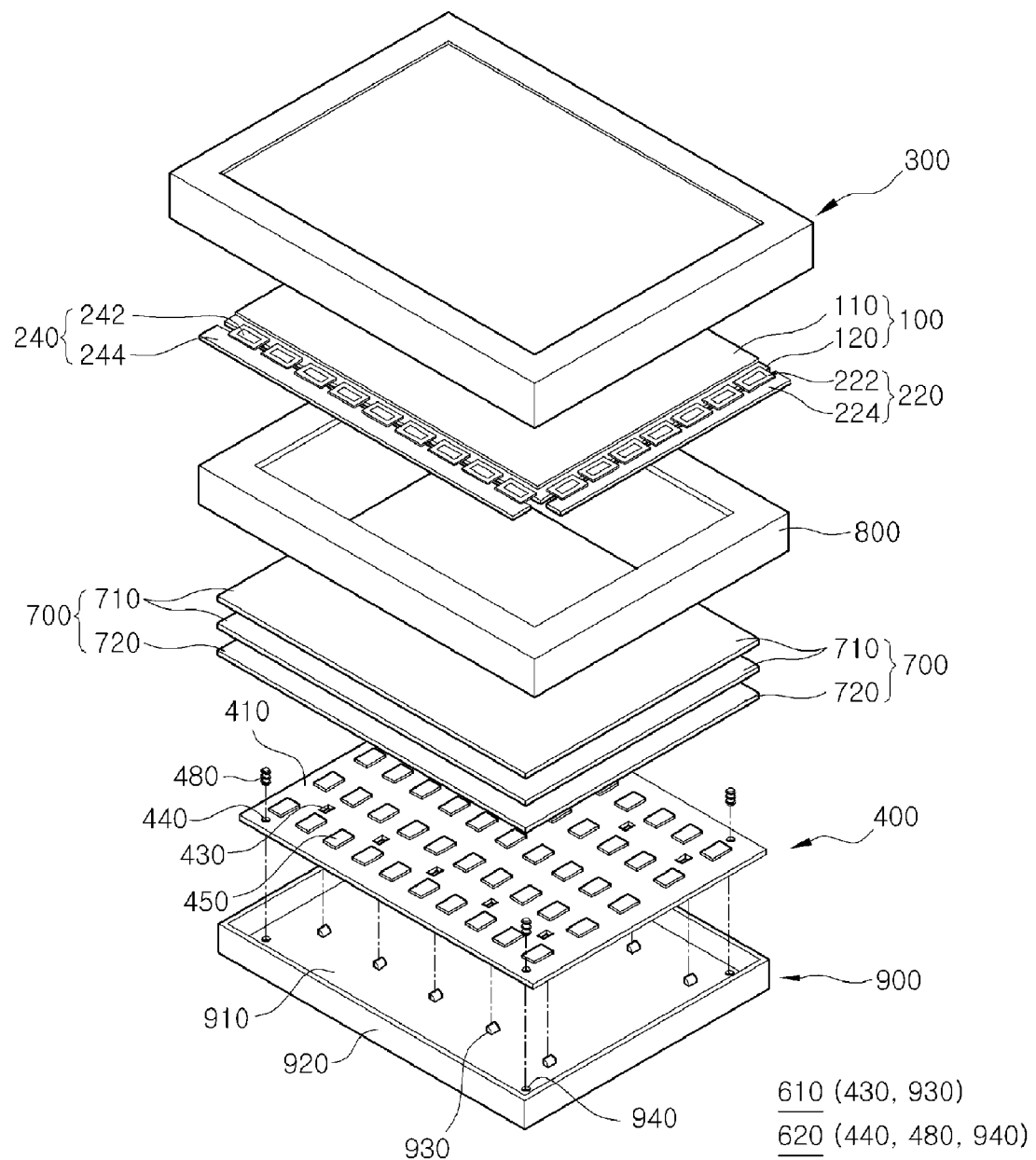
FIG. 12 is an exploded perspective view of a liquid crystal display having a backlight assembly according to a sixth exemplary embodiment of the present invention.

FIG. 12 is an exploded perspective view showing a liquid crystal display having a backlight assembly according to a sixth exemplary embodiment of the present invention.

Referring to FIG. 12, the liquid crystal display includes a liquid crystal display panel 100, driving circuit units 220 and 240, a top chassis 300, and a backlight assembly for providing light to the liquid crystal display panel 100. The backlight assembly includes a light source unit 400, a first fastening unit 610, a second fastening unit 620, a plurality of optical sheets 700, a mold frame 800, and a bottom chassis 900.

The light source unit 400 includes a circuit board 410 and light emitting diodes 450 mounted on the circuit board 410. The bottom chassis 900 includes a base plate 910 and sidewalls 920 bent from the base plate 910, and has a receiving space defined therein.

The light source unit 400 is disposed on and fastened to the base plate 910 of the bottom chassis 900 by means of the first fastening unit 610 and the second fastening unit 620. The circuit board 410 is formed corresponding to the base plate 910, and the light emitting diodes 450 are mounted on the circuit board 410 in a matrix form. The components of the first fastening unit 610 are formed in the middle region of the circuit board 410 and the base plate 910. The position and number of the components of the first fastening unit 610 may be variously changed. Further, the second fastening holes 440 of the second fastening unit 620 are formed at the ends of the circuit board 410, while the third fastening holes 940 are formed in the base plate 910 of the bottom chassis 900 corresponding to the positions of the second fastening holes 440, respectively.

According to the present invention, a light source unit can be fastened to a chassis without an additional fastening member or using a minimum number of fastening members, whereby the assembly process can be simplified and the manufacturing process time can also be shortened. As a result, the manufacturing cost for a backlight assembly and a liquid crystal display having the same can be reduced.

The above descriptions are merely exemplary embodiments of a backlight assembly and a liquid crystal display having the same according to the present invention, so that the present invention is not limited thereto. The true scope of the present invention should be defined to the extent that those skilled in the art can make various modifications and changes thereto without departing from the scope of the invention, as defined by the appended claims.

What is claimed is:

1. A backlight assembly, comprising:
    a light source unit comprising a circuit board and a light source mounted on the circuit board;
    a receiving container on which the light source unit is disposed; and
    a first fastening unit for fastening the light source unit to the receiving container,
    wherein the first fastening unit comprises:
    a first fastening hole formed in the circuit board; and
    a protrusion formed inwardly on the receiving container, the protrusion inserted into the first fastening hole to be fastened thereby,
    wherein the circuit board includes a first major side surface on which the light source is mounted and an opposite second major side surface facing the receiving container, and
    wherein the protrusion extends completely therethrough the first fastening hole extending from the second major side surface to and past the first major side surface so as to promote contact of the second major side surface of the circuit board with the receiving container.

2. The backlight assembly as claimed in claim 1, wherein the protrusion is formed integrally with the receiving container.

3. The backlight assembly as claimed in claim 1, wherein the receiving container comprises a base plate and a sidewall bent from the base plate.

4. The backlight assembly as claimed in claim 3, wherein the protrusion of the first fastening unit is formed on the sidewall of the receiving container.

5. The backlight assembly as claimed in claim 4, further comprising a second fastening unit for fastening the light source unit to the receiving container.

6. The backlight assembly as claimed in claim 5, wherein the second fastening unit comprises:
    a second fastening hole formed in the circuit board;
    a third fastening hole formed in the sidewall of the receiving container; and
    a fastening member inserted into the second hole and the third hole to be fastened thereto.

7. The backlight assembly as claimed in claim 6, wherein the second fastening hole is formed in each of both ends of the circuit board, and the third fastening hole is formed in the sidewall of the receiving container corresponding to positions of the second fastening holes.

8. The backlight assembly as claimed in claim 5, wherein the second fastening unit comprises:
    a second fastening hole formed in the circuit board; and
    a hook formed on the sidewall of the receiving container.

9. The backlight assembly as claimed in claim 5, wherein the second fastening unit comprises a fixing unit which is extended and bent from one end of the sidewall of the receiving container.

10. The backlight assembly as claimed in claim 3, wherein the protrusion of the first fastening unit is formed on the base plate of the receiving container.

11. The backlight assembly as claimed in claim 10, further comprising a second fastening unit for fastening the light source to the receiving container.

12. The backlight assembly as claimed in claim 11, wherein the second fastening unit comprises:
    a second fastening hole formed in the circuit board;
    a third fastening hole formed in the base plate of the receiving container; and
    a fastening member inserted into the second fastening hole and the third fastening hole to be fastened thereto.

13. The backlight assembly as claimed in claim 11, wherein the second fastening unit comprises:
    a second fastening hole formed in the circuit board; and
    a hook formed on the base plate of the receiving container.

14. The backlight assembly as claimed in claim 10, wherein the light source unit includes a plurality of circuit boards spaced apart from each other, each of the circuit boards being formed in the shape of a bar.

15. The backlight assembly as claimed in claim 10, wherein the circuit board is formed corresponding to the shape of the base plate.

16. The backlight assembly as claimed in claim 12, wherein the circuit board includes a plurality of substrates spaced apart from each other, each of the substrates being formed in the shape of a bar, the second fastening hole is formed at both ends of the substrates, respectively, and the third fastening hole is formed in the sidewall of the receiving container corresponding to positions of the second fastening holes.

17. The backlight assembly as claimed in claim 12, wherein the circuit board is formed corresponding to the shape of the base plate, the second fastening hole is formed in at least one end of the circuit board, and the third fastening hole is formed in the base plate of the receiving container corresponding to positions of the second fastening hole.

18. A liquid crystal display, comprising:
    a backlight assembly comprising a light source unit having a circuit board and a light source mounted on the circuit board, a receiving container on which the light source unit is disposed, and a first fastening unit for fastening the light source unit to the receiving container; and
    a liquid crystal display panel disposed on the backlight assembly to display an image,
    wherein the first fastening unit comprises:
    a first fastening hole formed in the circuit board; and
    a protrusion formed on the receiving container, the protrusion inserted into the first fastening hole to be fastened thereby,
    wherein the circuit board includes a first major side surface on which the light source is mounted and an opposite second major side surface facing the receiving container, and
    wherein the protrusion extends completely therethrough the first fastening hole extending from the second major side surface to and past the first major side surface so as to promote contact of the second major side surface of the circuit board with the receiving container.

19. The liquid crystal display as claimed in claim 18, wherein the protrusion is formed integrally with the receiving container.

20. The liquid crystal display as claimed in claim 19, further comprising a second fastening unit for fastening the light source to the receiving container.

* * * * *